Patented Sept. 28, 1926.

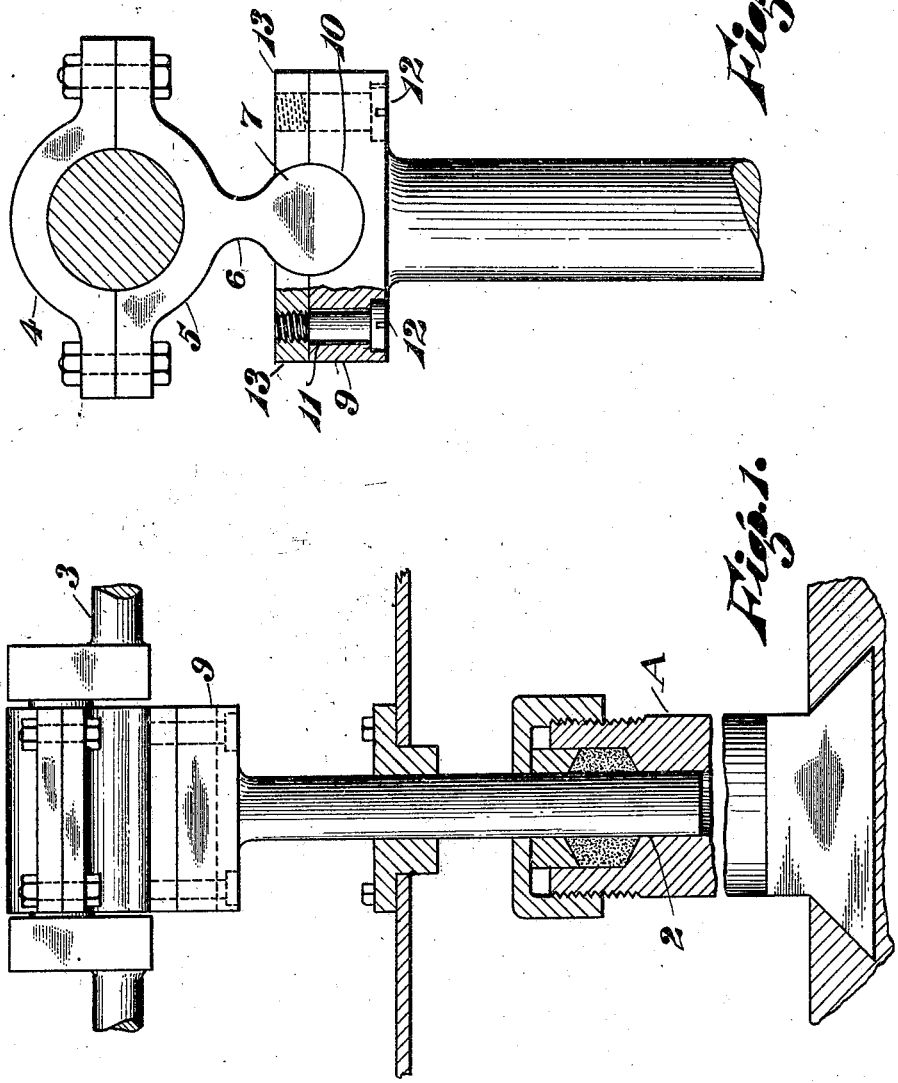

1,601,169

UNITED STATES PATENT OFFICE.

GEORGE L. FISH, OF LONG BEACH, CALIFORNIA, ASSIGNOR TO RAYMOND SALISBURY, TRUSTEE, OF OAKLAND, CALIFORNIA.

CONNECTING-ROD AND PLUNGER CONNECTION.

Application filed March 1, 1923. Serial No. 622,101.

This invention relates to a connecting rod and plunger connection for high pressure pumps, compressors and the like.

The object of the present invention is to generally improve and simplify structures of the character described, and especially to form an oscillating connection between the pump plunger and the connecting rod whereby a compact rigid structure and large bearing areas are obtained. Further objects will hereinafter appear.

One form which my invention may assume is exemplified in the following description and illustrated in the accompanying drawings, in which—

Fig. 1 is a side elevation of a pump partly in section showing the application of the invention.

Fig. 2 is a detail end view of the connection formed between the plunger, the crank pin bearing and the connecting rod.

In certain machine installations high pressure pumps, compressors, etc., are employed, and where the pressures exceed 1000 pounds or more per square inch rigid structures and large bearing areas are required to stand the stresses and loads to which the parts are subjected. In most installations of this character rigid plunger rods are employed and considerable difficulty is encountered when a connection is formed between the plunger and the connecting rod. In the present instance a bearing of large area is formed between the plunger and the connecting rod and a rigid compact structure is at the same time obtained. This is accomplished as follows:

A indicates the cylinder of a pump or a compressor, and 2 a plunger which is reciprocally mounted therein. Disposed in alignment with the plunger is a crank shaft 3 from which reciprocal movement is transmitted to the plunger. This is accomplished as follows: Surrounding the crank pin of the shaft 3 is a crank pin bearing which consists of two sections such as indicated at 4 and 5. The section 5 is slightly extended as shown at 6 to form a shortened connecting rod which terminates in a wrist pin 7. The connecting rod, the bearing 5 and the intermediate or shortened section of the rod, are in this instance formed as an integral part and as such produces an exceedingly rigid and substantial structure. The end of the plunger indicated at 2 is enlarged to form a bearing head 9 and this is recessed as at 10 to receive the upper half of the wrist pin 7. The head is otherwise perforated or drilled as indicated at 11 to receive two or more bolts or screws 12 and these are employed for the purpose of securing a pair of side strips such as indicated at 13. The inner faces of these strips are slightly rounded to receive the lower half of the wrist pin and to prevent disconnection of the wrist pin and the plunger.

The shortened connecting rod 6 has a width equal to the bearing 5, and the length of the wrist pin 7 is the same. The head 9 of the plunger rod is, therefore, enlarged and lengthened to cooperate therewith and bearing areas of large proportions are thus obtained when comparison is made with the diameter of the pump plunger 2, that is, a crank shaft of large diameter and short stroke can in this instance be readily connected to a plunger of fairly small diameter, thus making it possible to produce pressures running into several thousand pounds to the square inch without showing any tendency after continuous running to heat the bearings.

While certain features of the present invention are more or less specifically illustrated, I wish it understood that various changes in form and proportion may be resorted to within the scope of the appended claim, similarly that the materials and finish of the several parts employed may be such as the experience and judgment of the manufacturer may dictate or various uses may demand.

Having thus described my invention, what I claim and desire to secure by Letters Patent is—

The combination with the upper half of a crank pin bearing, of a shortened connecting rod formed integral therewith and having a width equal to the length of the bearing, a wrist pin formed integral with the shortened connecting rod and also having a length equal to that of the crank pin bearing, a plunger of proportionately small diameter, an enlarged head thereon having a length equal to the crank pin bearing, a semi-circular seat extending from end to end of the head and adapted to receive the upper half of the wrist pin, and a pair of strips extending lengthwise of the plunger head and secured thereto, said strips engaging the lower half of the wrist pin and preventing removal thereof but permitting oscillating movement of the wrist pin, the rod and the bearing.

<div style="text-align:right">GEORGE L. FISH.</div>